(12) United States Patent  (10) Patent No.: US 9,019,557 B2
Jinno et al.  (45) Date of Patent: Apr. 28, 2015

(54) COLOR PROCESSING METHOD AND COLOR PROCESSING APPARATUS

(75) Inventors: Takayuki Jinno, Kawasaki (JP); Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 13/040,100

(22) Filed: Mar. 3, 2011

(65) Prior Publication Data
US 2011/0242556 A1 Oct. 6, 2011

(30) Foreign Application Priority Data
Apr. 2, 2010 (JP) .................................. 2010-086465

(51) Int. Cl.
G06K 9/34 (2006.01)
B41J 2/205 (2006.01)
H04N 1/54 (2006.01)

(52) U.S. Cl.
CPC ....................................... H04N 1/54 (2013.01)

(58) Field of Classification Search
USPC ................. 358/1.9; 382/164; 347/15
See application file for complete search history.

(56) References Cited

U.S. PATENT DOCUMENTS

| | | | |
|---|---|---|---|
| 6,877,850 B2 | 4/2005 | Ishimoto et al. | |
| 6,923,523 B2 | 8/2005 | Nishikawa et al. | 347/43 |
| 7,178,898 B2 | 2/2007 | Hoshino | |
| 7,315,379 B2 | 1/2008 | Jinno | |
| 7,527,345 B2 | 5/2009 | Fukuda et al. | |
| 7,562,956 B2 | 7/2009 | Yamazaki et al. | |
| 7,697,177 B2 | 4/2010 | Nishikawa | 358/523 |
| 7,843,599 B2 | 11/2010 | Nishikawa et al. | 358/1.9 |
| 2005/0024399 A1 | 2/2005 | Fukuda et al. | |
| 2005/0052670 A1 | 3/2005 | Nishikawa | 358/1.9 |
| 2005/0052671 A1 | 3/2005 | Nishikawa | 358/1.9 |
| 2005/0156964 A1* | 7/2005 | Hoshino | 347/9 |
| 2007/0146753 A1 | 6/2007 | Nishikawa | 358/1.9 |
| 2007/0159645 A1 | 7/2007 | Nishikawa | 358/1.9 |
| 2007/0201029 A1 | 8/2007 | Jinno | |
| 2007/0211097 A1* | 9/2007 | Yamazaki et al. | 347/14 |

(Continued)

FOREIGN PATENT DOCUMENTS

CN 1623773 A 6/2005
EP 1354713 A2 10/2003

(Continued)

OTHER PUBLICATIONS

U.S. Appl. No. 13/010,541, filed Jan. 20, 2011 by Takashi Ochiai, et al.

(Continued)

*Primary Examiner* — Marivelisse Santiago Cordero
*Assistant Examiner* — Temitayo Folayan
(74) *Attorney, Agent, or Firm* — Fitzpatrick, Cella, Harper & Scinto

(57) ABSTRACT

A gloss characteristic measurement unit obtains measurement values regarding the gloss characteristic of a plurality of patches formed based on patch data in which the amount of clear color material is changed with respect to an output value from a color separation table for color materials. A color separation table generation unit selects one measurement value for each color or gray level indicated by the patch data, and generates, based on the selected measurement value and the color separation table for color materials, a color separation table in a case where the color materials and the clear color material are used.

10 Claims, 17 Drawing Sheets

(56) References Cited

U.S. PATENT DOCUMENTS

| | | | |
|---|---|---|---|
| 2007/0243314 A1 | 10/2007 | Jinno | 427/8 |
| 2008/0037046 A1* | 2/2008 | Nishikawa | 358/1.9 |
| 2008/0158280 A1* | 7/2008 | Imai | 347/15 |
| 2010/0134811 A1* | 6/2010 | Fukasawa et al. | 358/1.9 |

FOREIGN PATENT DOCUMENTS

| | | |
|---|---|---|
| JP | 2002-307755 | 10/2002 |
| JP | 2004-202790 | 7/2004 |
| JP | 2005-007591 A | 1/2005 |
| JP | 2005-199602 A | 7/2005 |
| JP | 2005-231350 A | 9/2005 |
| JP | 2006-177797 | 7/2006 |
| JP | 2007-076149 A | 3/2007 |
| JP | 3938184 | 6/2007 |
| JP | 2007-216604 A | 8/2007 |
| JP | 2007-276482 | 10/2007 |
| JP | 2010-046896 A | 3/2010 |

OTHER PUBLICATIONS

European Search Report issued on Dec. 13, 2012, in counterpart European Patent Application No. 11156600.6.

Chinese Office Action dated Jun. 5, 2013 in counterpart Chinese Appl. No. 201110085167.9 with English translation.

* cited by examiner

FIG. 8

| INPUT VALUE (8 BITS) | | | INK AMOUNT[%] | | | | |
|---|---|---|---|---|---|---|---|
| | | | COLOR INK | | | | CLEAR INK |
| R | G | B | C | M | Y | K | CL |
| 255 | 255 | 255 | 0.0 | 0.0 | 0.0 | 0.0 | 0.0 |
| 255 | 255 | 255 | 0.0 | 0.0 | 0.0 | 0.0 | 20.0 |
| 255 | 255 | 255 | 0.0 | 0.0 | 0.0 | 0.0 | 40.0 |
| 255 | 255 | 255 | 0.0 | 0.0 | 0.0 | 0.0 | 60.0 |
| 255 | 255 | 255 | 0.0 | 0.0 | 0.0 | 0.0 | 80.0 |
| 255 | 255 | 255 | 0.0 | 0.0 | 0.0 | 0.0 | 100.0 |
| 255 | 255 | 224 | 0.0 | 0.0 | 15.0 | 0.0 | 0.0 |
| 255 | 255 | 224 | 0.0 | 0.0 | 15.0 | 0.0 | 20.0 |
| 255 | 255 | 224 | 0.0 | 0.0 | 15.0 | 0.0 | 40.0 |
| 255 | 255 | 224 | 0.0 | 0.0 | 15.0 | 0.0 | 60.0 |
| 255 | 255 | 224 | 0.0 | 0.0 | 15.0 | 0.0 | 80.0 |
| 255 | 255 | 224 | 0.0 | 0.0 | 15.0 | 0.0 | 100.0 |
| 255 | 255 | 192 | 0.0 | 0.0 | 30.0 | 0.0 | 0.0 |
| 255 | 255 | 192 | 0.0 | 0.0 | 30.0 | 0.0 | 20.0 |
| 255 | 255 | 192 | 0.0 | 0.0 | 30.0 | 0.0 | 40.0 |
| 255 | 255 | 192 | 0.0 | 0.0 | 30.0 | 0.0 | 60.0 |
| 255 | 255 | 192 | 0.0 | 0.0 | 30.0 | 0.0 | 80.0 |
| 255 | 255 | 192 | 0.0 | 0.0 | 30.0 | 0.0 | 100.0 |
| ... | ... | ... | ... | ... | ... | ... | ... |
| 255 | 255 | 0 | 0.0 | 0.0 | 100.0 | 0.0 | 0.0 |
| 255 | 255 | 0 | 0.0 | 0.0 | 100.0 | 0.0 | 20.0 |
| 255 | 255 | 0 | 0.0 | 0.0 | 100.0 | 0.0 | 40.0 |
| 255 | 255 | 0 | 0.0 | 0.0 | 100.0 | 0.0 | 60.0 |
| 255 | 255 | 0 | 0.0 | 0.0 | 100.0 | 0.0 | 80.0 |
| 255 | 255 | 0 | 0.0 | 0.0 | 100.0 | 0.0 | 100.0 |

FIG. 12

| INPUT VALUE (8 BITS) | | | INK AMOUNT[%] | | | | |
|---|---|---|---|---|---|---|---|
| | | | COLOR INK | | | | CLEAR INK |
| R | G | B | C | M | Y | K | CL |
| 255 | 255 | 255 | 0.0 | 0.0 | 0.0 | 0.0 | 0.0 |
| 255 | 255 | 255 | 0.0 | 0.0 | 0.0 | 0.0 | 20.0 |
| 255 | 255 | 255 | 0.0 | 0.0 | 0.0 | 0.0 | 40.0 |
| 255 | 255 | 255 | 0.0 | 0.0 | 0.0 | 0.0 | 60.0 |
| 255 | 255 | 255 | 0.0 | 0.0 | 0.0 | 0.0 | 80.0 |
| 255 | 255 | 255 | 0.0 | 0.0 | 0.0 | 0.0 | 100.0 |
| 255 | 255 | 255 | 0.0 | 0.0 | 0.0 | 0.0 | 120.0 |
| 255 | 255 | 224 | 0.0 | 0.0 | 15.0 | 0.0 | 0.0 |
| 255 | 255 | 224 | 0.0 | 0.0 | 15.0 | 0.0 | 20.0 |
| 255 | 255 | 224 | 0.0 | 0.0 | 15.0 | 0.0 | 40.0 |
| 255 | 255 | 224 | 0.0 | 0.0 | 15.0 | 0.0 | 60.0 |
| 255 | 255 | 224 | 0.0 | 0.0 | 15.0 | 0.0 | 80.0 |
| 255 | 255 | 224 | 0.0 | 0.0 | 15.0 | 0.0 | 100.0 |
| 255 | 255 | 224 | 0.0 | 0.0 | 15.0 | 0.0 | 105.0 |
| 255 | 255 | 192 | 0.0 | 0.0 | 30.0 | 0.0 | 0.0 |
| 255 | 255 | 192 | 0.0 | 0.0 | 30.0 | 0.0 | 20.0 |
| 255 | 255 | 192 | 0.0 | 0.0 | 30.0 | 0.0 | 40.0 |
| 255 | 255 | 192 | 0.0 | 0.0 | 30.0 | 0.0 | 60.0 |
| 255 | 255 | 192 | 0.0 | 0.0 | 30.0 | 0.0 | 80.0 |
| 255 | 255 | 192 | 0.0 | 0.0 | 30.0 | 0.0 | 90.0 |
| ... | ... | ... | ... | ... | ... | ... | ... |
| 255 | 255 | 0 | 0.0 | 0.0 | 100.0 | 0.0 | 0.0 |
| 255 | 255 | 0 | 0.0 | 0.0 | 100.0 | 0.0 | 20.0 |

FIG. 15

| PRINT SETTINGS | |
|---|---|
| INPUT IMAGE DATA | ◯◯◯.tif — 1502 |
| PAPER TYPE | GLOSSY PAPER ▼ |
| | MAT PAPER |
| | POSTCARD |
| | OTHERS |

1501

1503

COLOR PROCESSING METHOD

SUPPRESSION OF HETEROGENEITY OF SPECULAR GLOSSINESS — 1505
0% ———————————— 100%

SUPPRESSION OF HETEROGENEITY OF IMAGE CLARITY — 1506
0% ———————————— 100%

SUPPRESSION OF HETEROGENEITY OF SPECULAR COLOR — 1507
0% ———————————— 100%

1504

CONSUMPTION OF CLEAR INK — 1508
0% ———————————— 100%

[ PRINT ] 1509    [ CANCEL ] 1510

F I G. 20
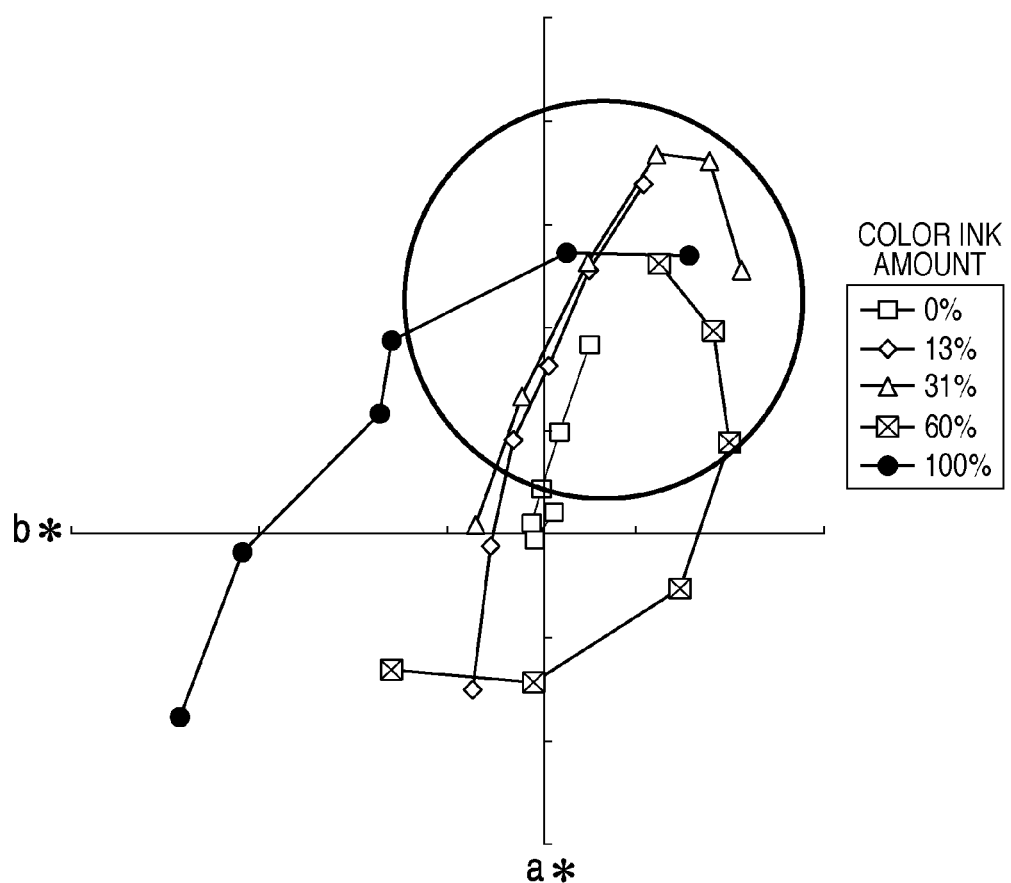

F I G. 24A
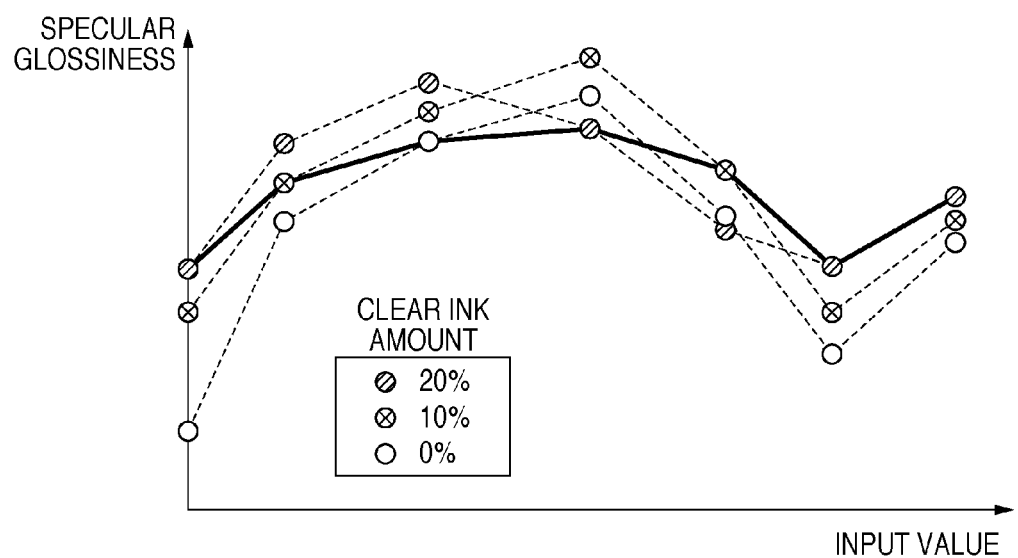
F I G. 24B
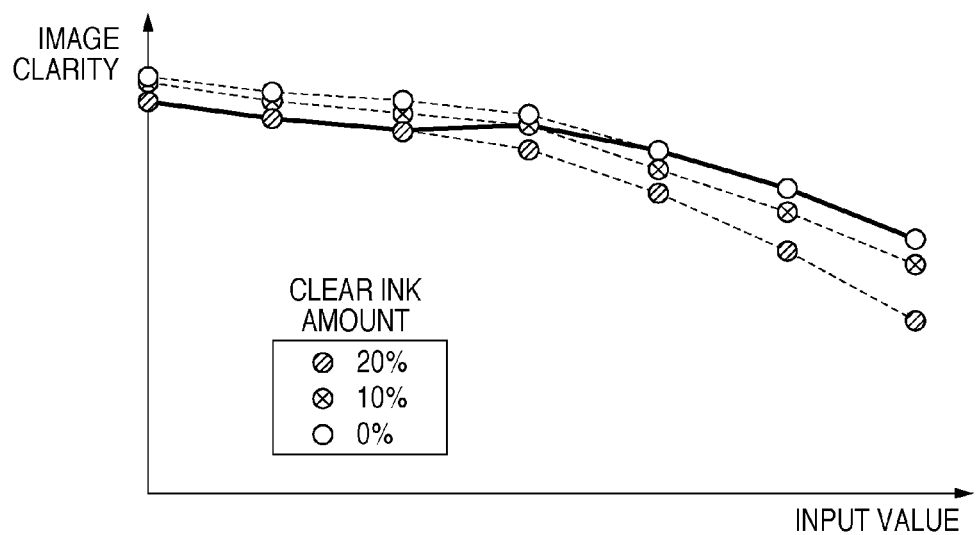

COLOR PROCESSING METHOD AND COLOR PROCESSING APPARATUS

BACKGROUND OF THE INVENTION

1. Field of the Invention

The present invention relates to a color processing method and a color processing apparatus and, more particularly, to a color processing method and a color processing apparatus for generating a color separation table used in an image forming apparatus which forms an image using color materials and a clear color material.

2. Description of the Related Art

As an ink for an inkjet recording apparatus, a dye ink containing a water-soluble dye as a color material is widely used. The color material dissolved in a solvent in the dye ink, whose main component is water, easily permeates into the fiber of a recording medium. This makes it easy to maintain the surface shape of the recording medium even after recording an image, and the gloss of the recording medium itself is kept as that of the image. In other words, an image excellent in gloss can be easily obtained by recording an image on a recording medium excellent in gloss using the dye ink. The inkjet recording apparatus using the dye ink can adjust the gloss of an image by adjusting that of a recording medium.

The dye ink is generally poor in lightfastness; the dye molecule of the color material is decomposed by light, and an image readily fades. In general, a material printed with the dye ink is also poor in water resistance; when it gets wet, the dye molecule permeated in the fiber is dissolved in water, and the image smears.

To solve the poor lightfastness and water resistance with the use of the dye ink, a pigment ink using a pigment as a color material has been developed recently. Unlike the dye present as a molecule, the pigment ink exists as a particle several ten nm to several µm in diameter in the solvent. The color material particle of the pigment ink is larger than that of the dye ink, and a printed material with high lightfastness and water resistance can be attained.

The color material of the pigment ink hardly permeates into a recording medium and accumulates on the surface of the recording medium. The fine shape of the image surface, therefore, differs between a region where the pigment ink is applied and a region where it is not applied. The amount of color material used changes depending on the density and color of an image. Hence, the area which the color material covers on the recording medium changes, the reflectance of the color material and the surface reflectance of the recording medium differ from each other, and thus the gloss varies owing to the difference in area which the color material covers on the recording medium.

For these reasons, recording an image using the pigment ink causes a phenomenon called "heterogeneity of glossiness" in which the gloss changes depending on the density and color of an image. Once heterogeneity of glossiness occurs, a glossy region observed to be glossy and a matte region observed not to be glossy coexist in a single image. Especially when the image is a photographic image, this causes the image to be recognized as a poor image.

The heterogeneity of glossiness occurs not only in an inkjet recording apparatus using pigment ink but also in an electrophotographic recording apparatus which records an image by fixing toner onto a recording medium. For example, in a region where the amount of applied toner is large, fixing makes the image surface greatly smooth. For plain paper with low glossiness, the glossiness becomes higher in a region where an image exists than in a region where no image exists and the surface of the recording medium is exposed. Note that it is known that the glossiness of a region where an image exists changes depending on the application amount, fixing temperature, and fixing speed of toner, and the like.

To suppress the heterogeneity of glossiness, a method using a substantially colorless invisible ink (to be referred to as a clear ink) which does not affect color reproduction is known. More specifically, the heterogeneity of glossiness is suppressed by applying a clear ink or white color ink to a region not covered with a color ink (for example, Japanese Patent Laid-Open No. 2002-307755 (reference 1)). There are also known a method of recording while keeping the total amount of color and clear inks constant regardless of the color or gray level to be reproduced, and a method of recording while keeping the total amount of color and clear inks constant in a region (to be referred to as a highlight portion) where the gray level is lower than a predetermined density (for example, Japanese Patent Laid-Open No. 2007-276482 (reference 2)).

Another method uses an ink (to be referred to as a semiclear ink) which has a faint color and is not substantially colorless (for example, Japanese Patent Laid-Open No. 2004-202790 (reference 3)). The semiclear ink has a characteristic in which a color reproduced using both the semiclear and color inks differs from one reproduced using only the color ink. When using the semiclear ink, first, a plurality of patches is printed at different recording amounts of semiclear and color inks. Then, combinations of semiclear and color inks which reproduce predetermined colors are obtained based on the colorimetric values of the patches, generating a color separation lookup table (to be referred to as a color separation table).

However, in the technique disclosed in reference 1, dots of the clear ink are formed at positions where they have an exclusive relationship with dots formed using a color ink. In other words, the entire surface of a recording medium is covered with ink regardless of whether the ink is a color or clear ink. This method does not use the clear ink at intermediate and higher densities at which the entire surface of a recording medium is covered with the color ink. At intermediate and higher densities, the amount of clear ink used may not be optimum for suppressing the heterogeneity of glossiness.

In the technique disclosed in reference 2, the total amount of color and clear inks is made constant regardless of the reproduction color and gray level. In some cases, the clear ink may be used more than necessary, or the amount of clear ink used may be insufficient to suppress the heterogeneity of glossiness depending on the characteristics (for example, surface roughness and surface reflectance) of each ink used that affect the gloss.

The technique disclosed in reference 3 can obtain the amount of semiclear ink used to achieve a desired reproduction color, but does not attain the amount of semiclear ink used to suppress the heterogeneity of glossiness.

In addition to the above-described heterogeneity of glossiness, recording apparatuses using the pigment ink and toner have the following problems.

Some types of pigment inks and toners used cause thin-film interference on a thin film formed by the pigment ink or toner on the surface of a recording medium. The thin-film interference occurs when the thickness of the thin film is equivalent to the wavelength of light and its surface is relatively smooth. If the thin-film interference occurs, specular reflection by a printed material (and light diffused near the angle of specular reflection) has various colors.

A printed material recorded with the pigment ink or toner generates reflection having wavelength dependence in accordance with the characteristics of a material exposed on the surface of the printed material. This is called a "bronze phenomenon". Once the bronze phenomenon occurs, specular reflection by a printed material (and light diffused near the angle of specular reflection) is colored, similar to the thin-film interference. The observer observes specular reflection by a printed material as an illumination image reflected in the printed material. For this reason, if the thin-film interference or bronze phenomenon is generated, the color of an illumination image reflected in a printed material is observed as a color different from the original illumination color. In the following description, the phenomenon in which an illumination image reflected due to the thin-film interference is observed to have a color will be called a "structural color", and the phenomenon in which an illumination image reflected owing to the bronze phenomenon is observed to have a color will be called a "bronze color". Also, these colors will be generically called a "specular color".

A printed material recorded with the pigment ink or toner has a different surface structure and material depending on the reproduction color and gray level. As described above, the thin-film interference and bronze phenomenon depend on the surface structure and material of a printed material, so a printed material whose surface structure and material change for each color or gray level has a different specular color for each color or gray level. The observer feels such a printed material to be unnatural because the specular color of an image region formed in a plurality of colors is observed to be different depending on the image position. This phenomenon will be called "heterogeneity of specular color". Conventionally, image formation has not considered the specular color.

In some cases, the specular glossiness and image clarity will be generically called "gloss", and the gloss and specular color will be called "gloss characteristic" at once.

SUMMARY OF THE INVENTION

In an aspect, a color processing apparatus comprising: an obtainer, configured to obtain measurement values regarding a gloss characteristic of a plurality of patches formed based on patch data in which a color material amount of a clear color material is changed with respect to an output value from a color separation table for color materials; a selector, configured to select one measurement value from the measurement values of the plurality of patches for each color or gray level indicated by the patch data; and a generator, configured to generate, based on the selected measurement value and the color separation table, a color separation table in a case where the color materials and the clear color material are used.

According to the aspect, the heterogeneity of the gloss characteristic of an image formed using color materials and a clear color material can be suppressed.

Further features of the present invention will become apparent from the following description of exemplary embodiments with reference to the attached drawings.

BRIEF DESCRIPTION OF THE DRAWINGS

FIG. 8 is a table for explaining an example of cross patch data.

FIG. 12 is a table for explaining an example of cross patch data considering the limitation of the total amount of applied color materials.

FIG. 15 is a view for explaining a UI provided by a printing condition setting unit.

FIG. 20 is a graph showing measurement values (patches) selectable in accordance with the setting of priority of suppressing the heterogeneity of specular color.

FIGS. 24A and 24B are graphs showing the result of measuring, with respect to the input value, the specular glossinesses and image clarities of a plurality of patches that satisfy the setting of the amount of clear ink used when the amount of clear ink is changed.

DESCRIPTION OF THE EMBODIMENTS

A color processing method and a color processing apparatus according to an embodiment of the present invention will be described in detail below with reference to the accompanying drawings. Although the embodiment of the present invention will be explained by exemplifying an inkjet image forming apparatus, the present invention is also applicable to an electrophotographic image forming apparatus using toner.

[Arrangement of Apparatus]

Figure 14:
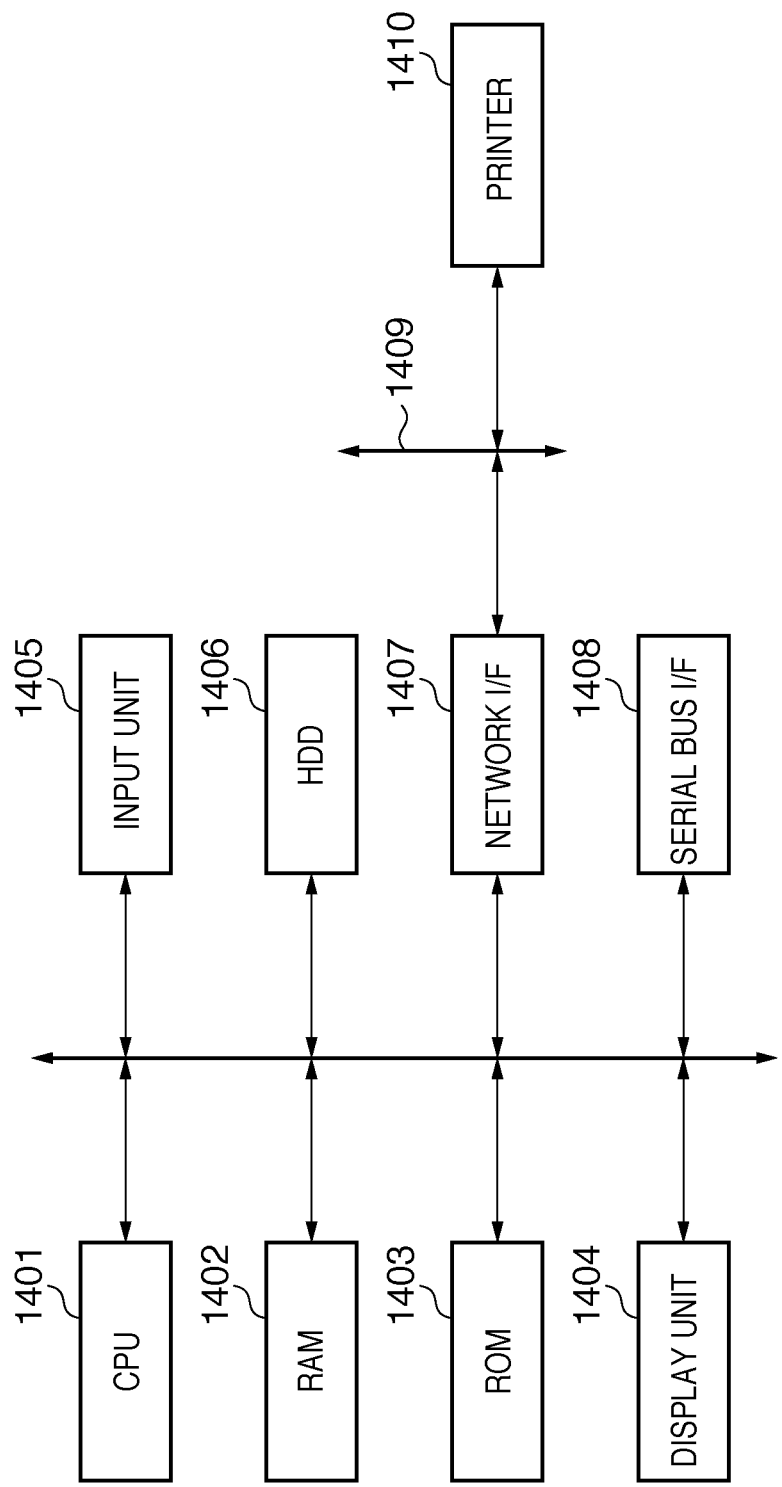
FIG. 14 is a block diagram for explaining the arrangement of an image processing apparatus according to the embodiment.

The arrangement of an image processing apparatus according to the embodiment will be explained with reference to the block diagram of FIG. 14.

A microprocessor (CPU) 1401 controls the operation of the overall apparatus by executing programs stored in a read-only memory (ROM) 1403 and hard disk drive (HDD) 1406 using a random access memory (RAM) 1402 as a work memory. The CPU 1401 displays, on a display unit 1404, data to be processed and a user interface (UI) to be described later, and receives a user instruction from an input unit 1405 including a keyboard, mouse, touch panel, and the like. The CPU 1401 includes a network interface (I/F) 1407, and a serial bus I/F 1408 such as a USB (Universal Serial Bus) interface or IEEE1394 interface. The CPU 1401 is connected to a peripheral device such as a printer 1410, a server, or the like via a network 1409 or a serial bus (not shown), and inputs/outputs an image.

[Functional Arrangement]

Figure 1:
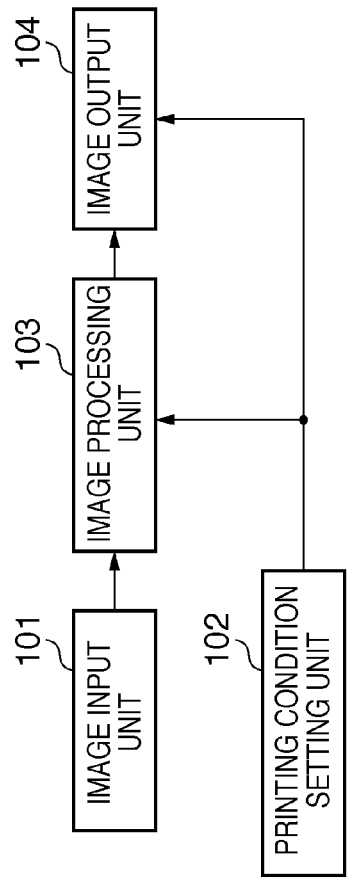
FIG. 1 is a block diagram for explaining the functional arrangement of an image processing apparatus according to an embodiment.

The functional arrangement of the image processing apparatus according to the embodiment will be explained with reference to the block diagram of FIG. 1.

An image input unit 101 inputs image data (to be referred to as an input image) to be printed. A printing condition setting unit 102 provides the user with a UI for setting printing conditions such as the type of recording medium and the color processing method when printing an image. Note that the printing condition setting unit 102 may be a printer driver which provides a UI (to be described later) and runs on, for example, a computer apparatus that supplies image data to the image processing apparatus.

An image processing unit 103 performs image processing for an input image in correspondence with printing conditions set by the printing condition setting unit 102. An image output unit 104 is a recording apparatus such as an inkjet printer, and prints an image based on image data output from the image processing unit 103 on a recording medium of a type set by the printing condition setting unit 102.

Figure 2:
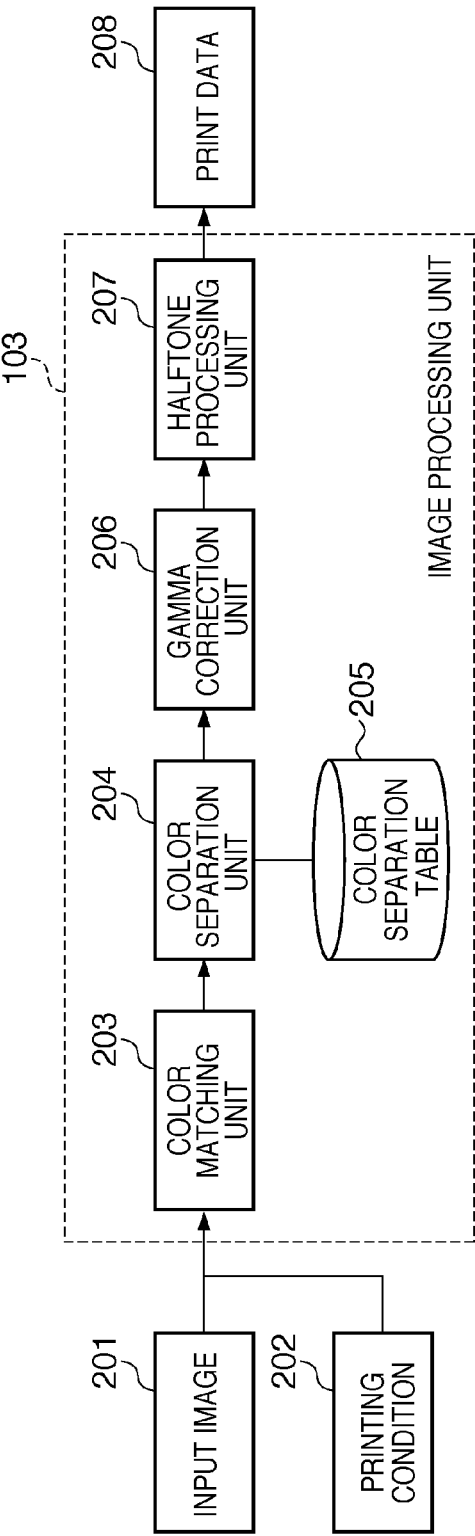
FIG. 2 is a block diagram for explaining the arrangement of an image processing unit.

The arrangement of the image processing unit 103 will be described with reference to the block diagram of FIG. 2.

A color matching unit 203 executes color matching processing for an input image 201 using a color conversion table. The color matching processing is processing of mapping the input image 201 in the color gamut of, for example, the monitor into the color reproductive range (color gamut) of the image output unit 104. Although not shown, the image processing unit 103 may include, for example, a resolution conversion unit which, when the resolution of the input image 201 is high and the image output unit 104 cannot handle the resolution of the input image 201, converts (reduces) the resolution of the input image 201 into one processible by the image output unit 104 before processing by the color matching unit 203.

A color separation unit 204 separates the color of an image having undergone color matching processing by looking up a color separation table 205. A gamma correction unit 206 executes gamma correction (gray level correction) for color-separated signal values (to be referred to as ink values) corresponding to, for example, C, M, Y, and K color materials. A halftone processing unit 207 performs halftone processing to convert the number of gray levels of an image (to be referred to as a plane image) corresponding to each color material after gamma correction into that of gray levels processible by the image output unit 104, generating print data 208 to be output to the image output unit 104.

[Generation of Color Separation Table]

Generation of the color separation table 205 will be explained with reference to the block diagram of FIG. 3. Generation of the color separation table 205 will also be described with reference to the flowchart of FIG. 4.

A color separation table generation unit 403 obtains a color separation table 401 generated in advance for color inks (step S301). The color separation table 401 for color inks is a lookup table (LUT) which defines in advance a condition for separating the signal values (for example, R, G, and B values) of an input image into the ink values of color inks in the image output unit 104. The color separation table 401 for color inks is generated in consideration of characteristics such as the color reproductive range of the image output unit 104, graininess, gray scale, and heterogeneity of density.

Then, the color separation table generation unit 403 obtains a gloss characteristic table 402 for cross patches (step S302). The cross patches are a plurality of patches printed by the image output unit 104 while changing the ink value of a clear ink (to be referred to as a CL ink) at a plurality of stages for each ink value output from the color separation table 401 for color inks.

The color separation table generation unit 403 generates the color separation table 205 based on the color separation table 401 for color inks and the obtained gloss characteristic table 402 (step S303). Note that the color separation table generation unit 403 determines the ink value of the CL ink corresponding to the signal value of an input image to suppress the heterogeneity of glossiness and the heterogeneity of specular color, details of which will be described later.

Figure 3:
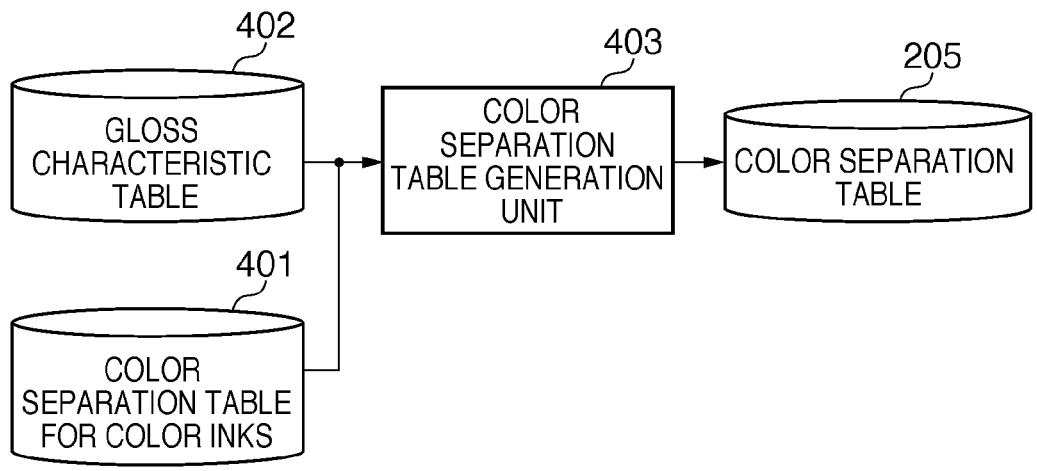
FIG. 3 is a block diagram for explaining generation of a color separation table.
Figure 4:
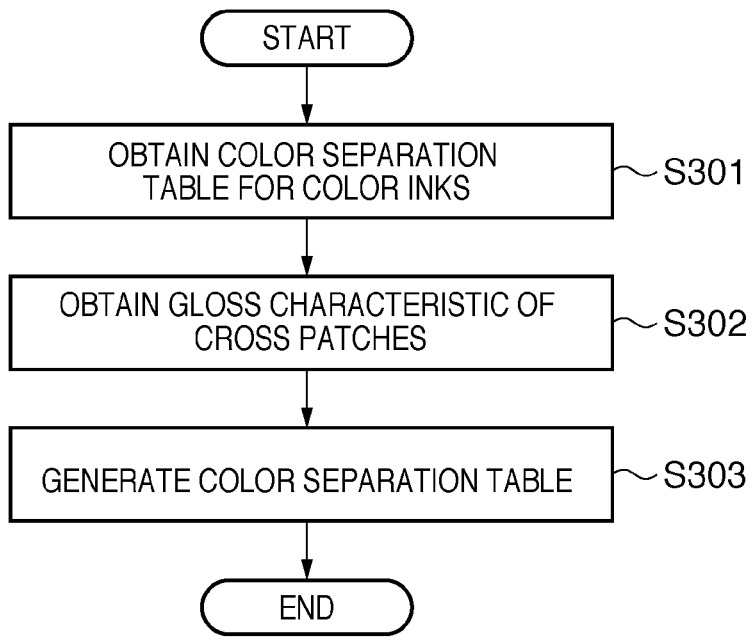
FIG. 4 is a flowchart for explaining generation of a color separation table.

FIGS. 3 and 4 correspond to a method of generating, using a given type of recording medium, for example, a color separation table 205 which puts importance on suppression of the heterogeneity of specular color. Considering various printing conditions such as a case in which various kinds of recording media with different glossinesses are used and a case in which importance is attached to suppression of the heterogeneity of glossiness, only one color separation table 205 cannot cope with all these printing conditions. Thus, a method of generating the color separation table 205 in accordance with a printing condition set by the user will be explained.

Figure 5:
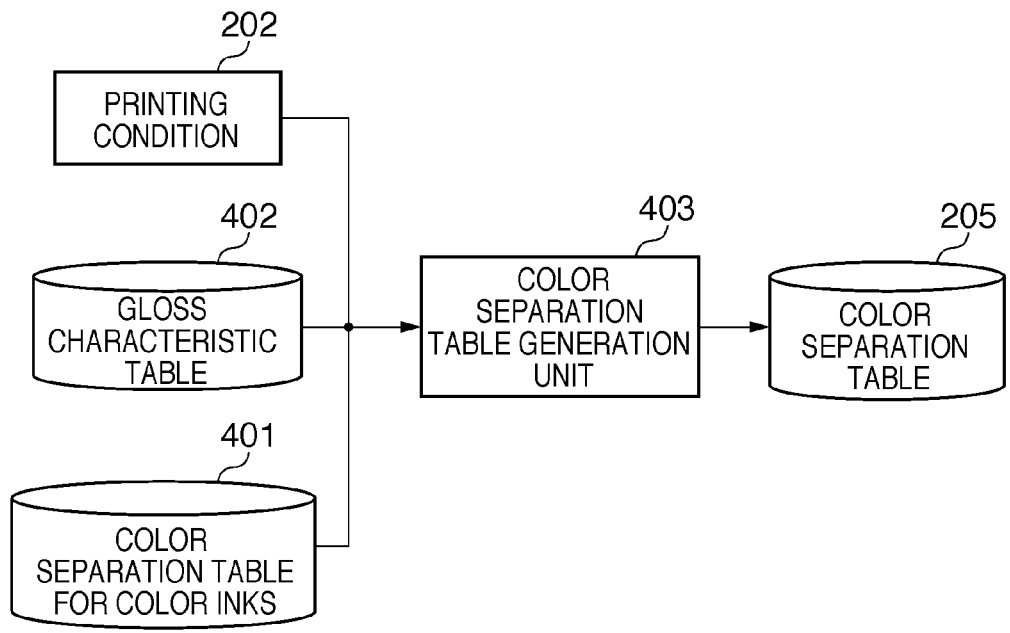
FIG. 5 is a block diagram for explaining generation of a color separation table corresponding to a printing condition.
Figure 6:
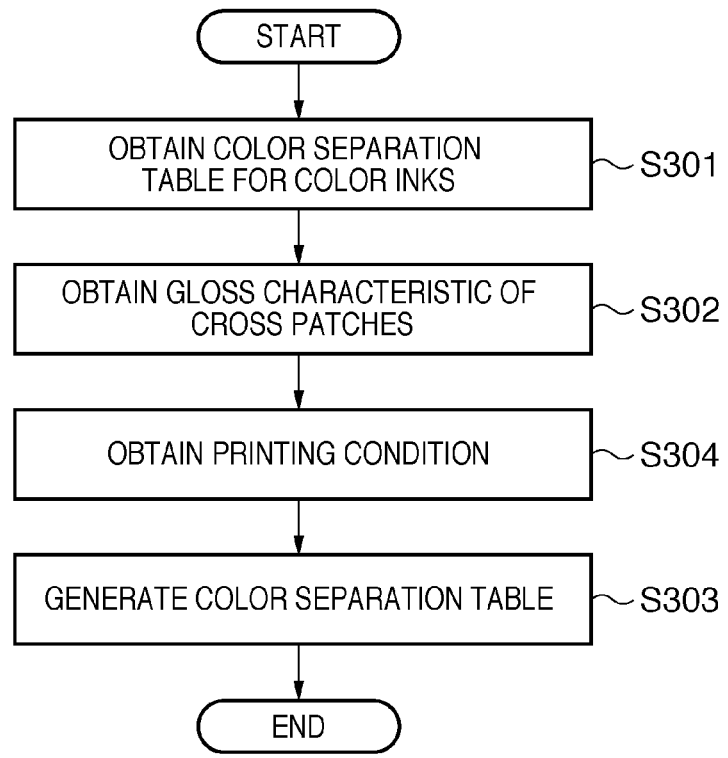
FIG. 6 is a flowchart for explaining generation of a color separation table corresponding to a printing condition.

Generation of the color separation table 205 corresponding to a printing condition will be described with reference to the block diagram of FIG. 5. Also, generation of the color separation table 205 corresponding to a printing condition will be described with reference to the flowchart of FIG. 6. Note that the same reference numerals as those in FIGS. 3 and 4 denote the same parts and processes, and a detailed description thereof will not be repeated.

The color separation table generation unit 403 obtains a printing condition 202 (step S304), and generates a color separation table 205 based on the color separation table 401 for color inks, the gloss characteristic table 402 for cross patches, and the printing condition 202 (step S303). The printing condition 202 includes the type of recording medium used for printing, an item (for example, suppression of the heterogeneity of glossiness or suppression of the heterogeneity of specular color) on which the user puts importance, and the consumption of the CL ink, details of which will be described later.

Figure 7:
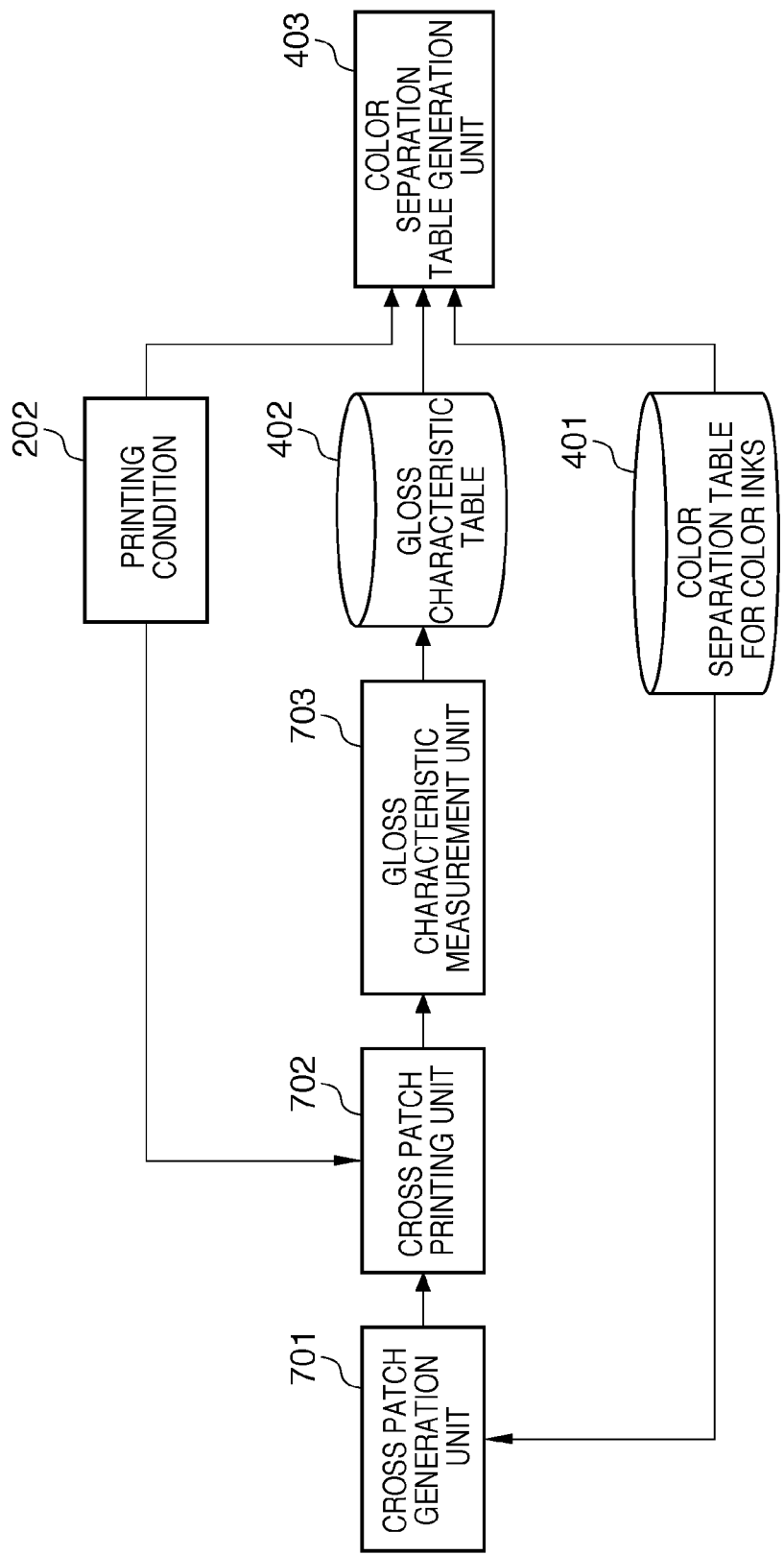
FIG. 7 is a block diagram for explaining generation of cross patches and measurement of the gloss characteristic of the cross patches.

Generation of cross patches and measurement of the gloss characteristic of the cross patches will be explained with reference to the block diagram of FIG. 7.

A cross patch generation unit 701 generates data (to be referred to as cross patch data) in which the ink value of the CL ink is changed at a plurality of stages corresponding to combinations of the ink values of color inks for input R, G, and B values (grid coordinate values) in the color separation table 401 for color inks. The cross patch data will be exemplified with reference to FIG. 8. FIG. 8 exemplifies input R, G, and B values each of 8 bits, and shows the amounts of color inks and six amounts of the CL ink with respect to typical signal values (grid coordinate values in the color separation table 401) of an input image. Note that the ink amount shown in FIG. 8 is a relative value when, for example, the ink amount (discharge amount) by which the unit area is covered is set as a reference value of 100%. The cross patch data suffices to represent the correspondence between the signal value of an input image and the amount of each color ink. The cross patch data may be not the ink amount but, for example, an 8-bit ink value, and the correspondence between the ink value and the ink amount may be held in another table.

A cross patch printing unit 702 prints a plurality of patches complying with cross patch data on a recording medium indicated by the printing condition 202 by using the image output unit 104. Patches printed on a recording medium will be exemplified with reference to FIG. 9. Patches aligned in the vertical direction shown in FIG. 9 have different ink values of each color ink, and those aligned in the horizontal direction have the same ink value of the color ink and different ink values of the CL ink. In other words, the color or gray level changes in the vertical direction, and only the glossiness and specular color change in the horizontal direction without changing the color or gray level.

Figure 9:
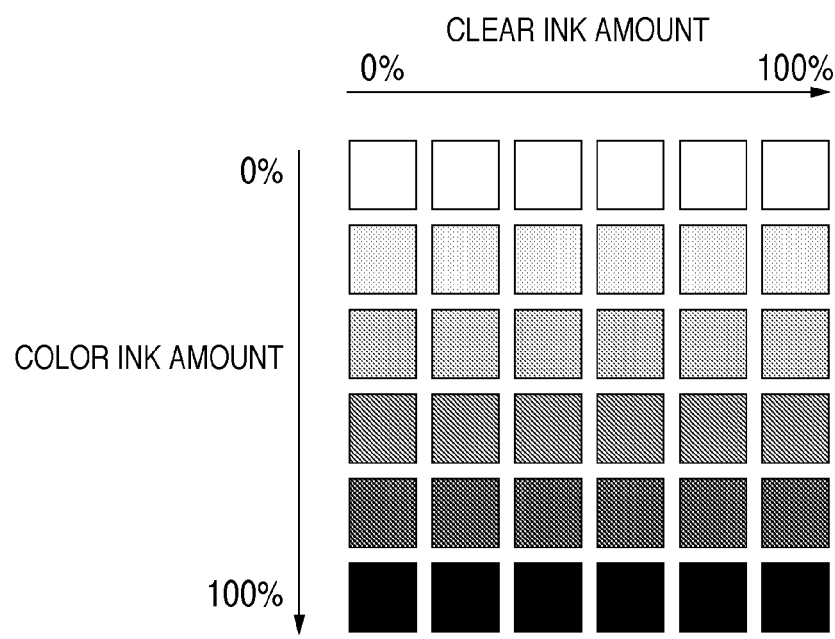
FIG. 9 is a view for explaining an example of patches printed on a recording medium.

A gloss characteristic measurement unit 703 stores, in the gloss characteristic table 402, patch data obtained by measuring the gloss characteristics of the patches shown in FIG. 9 by a "gloss characteristic measurement method" to be described later. Note that the gloss characteristic handled here includes any one of the specular glossiness, image clarity, and specular color, details of which will be described later.

Figure 10:
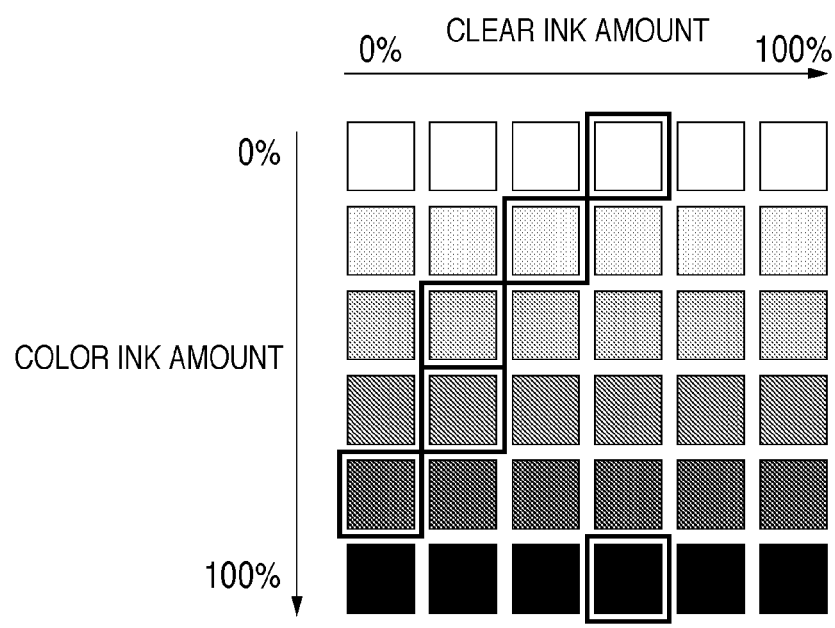
FIG. 10 is a view for explaining a method of determining the ink value of a clear ink.

As described above, the color separation table generation unit 403 determines the ink value of the CL ink for each ink value of the color ink using the gloss characteristic table 402. A method of determining the ink value of the CL ink will be explained with reference to FIG. 10. The color separation table generation unit 403 selects patch data based on the gloss characteristic measurement result to minimize the difference in gloss characteristic between different colors or gray levels. The selected patch data correspond to, for example, patches surrounded by bold frames in FIG. 10. In other words, one patch is selected for one color or gray level. The color separation table generation unit 403 stores, in the color separation table 205, the ink value of the CL ink of the selected patch as an ink value of the CL ink that corresponds to the ink value of the color ink and suppresses the heterogeneity of glossiness or the heterogeneity of specular color. Note that the patch is preferably selected based on the result of measurement by the "gloss characteristic measurement method" to be described later. However, the patch may be selected based on human subjective evaluation.

Figure 11:
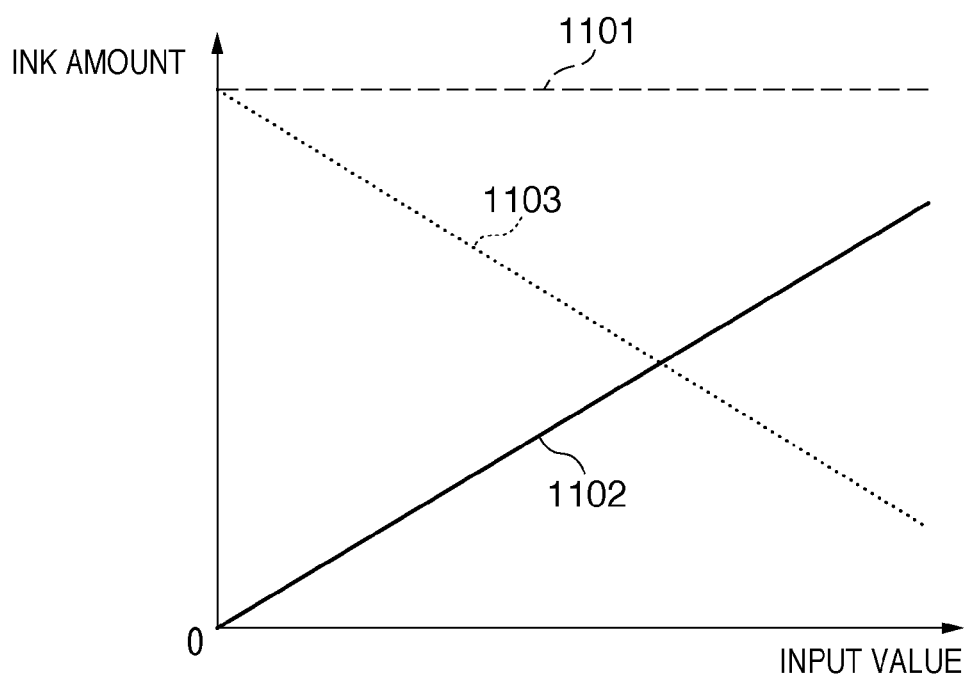
FIG. 11 is a graph for explaining the relationship between the input value and the ink amount.

In the above example, the amount of CL ink is changed linearly through six stages from 0% to 100%. However, some recording media define the limitation of the total amount of applied inks (limitation of the total amount of applied color materials), and the amount of CL ink needs to be changed nonlinearly. The relationship between the input value and the ink amount will be explained with reference to FIG. 11. In FIG. 11, a broken line 1101 indicates the limitation of the total amount of applied color materials for a printed material, and a solid line 1102 indicates the amount of color ink which is obtained from the color separation table 401 for color inks with respect to the input value. The difference (dotted line 1103) between the ink amount indicated by the broken line 1101 and one indicated by the solid line 1102 serves as the maximum amount of CL ink. In other words, the CL ink cannot be applied by an amount exceeding the dotted line 1103. Cross patch data considering the limitation of the total amount of applied color materials will be exemplified with reference to FIG. 12. In the example of FIG. 12, the limitation of the total amount of applied color materials is 120%. The number of patches to be printed and measured can be decreased by adjusting the amount of CL ink in consideration of the limitation of the total amount of applied color materials.

Gloss Characteristic Measurement Unit

The gloss characteristic measurement method by the gloss characteristic measurement unit 703 will be described. Gloss evaluation of a recording medium generally uses the measurement value of a gloss meter compliant with a specular glossiness measurement method (JIS Z 8741) of measuring the intensity of specular reflection. Gloss evaluation of a high-gloss object such as the outer plate of an automobile uses a reflection haze measurement method (ISO13803, ASTM E 430) of measuring the degree of haze of a sample surface, or an image clarity measurement method (JIS K 7105, JIS H 8686) of measuring the image clearness of an object image reflected on a sample surface. In an inkjet printer using a high-gloss recording medium for photo printing and the like, evaluation using not only the specular glossiness but also image clarity (or reflection haze) suitably matches observer's subjective evaluation, as disclosed in Japanese Patent No. 3938184.

In the following description, the specular glossiness is a specular glossiness value measured by a measuring device (for example, gloss meter VG-2000 available from NIPPON DENSHOKU INDUSTRIES CO., LTD.) compliant with the specular glossiness measurement method. The image clarity is an image clearness value measured by a measuring device (for example, image clarity meter ICM-1T available from Suga Test Instruments Co., Ltd.) compliant with the image clarity measurement method or a reflection haze value measured by the reflection haze measurement method. Since the reflection light intensity distribution of a sample is measured by changing the angles of the light source and light receiver, an extracted intensity in the specular reflection direction (or maximum intensity) may be used instead of the specular glossiness. The measurement result of a goniophotometer is called a "bidirectional reflectance distribution function (BRDF)". The spread (for example, half-width) of the BRDF near the angle of specular reflection may be handled as the image clarity. Further, values obtained by converting the above-mentioned specular glossiness (including the maximum value of the BRDF) and image clarity (including the image clearness, reflection haze, and BRDF half-width) to further match the human sense may be adopted.

In the embodiment, the specular color is measured using a method disclosed in Japanese Patent Laid-Open No. 2006-177797. More specifically, the tristimulus values Xx, Yx, and Zx of specular reflection of a sample to be measured, and the tristimulus values Xs, Ys, and Zs of a light source are measured. The L*, a*, and b* values of specular reflection of the sample are calculated based on JIS Z 8729. The calculation equation is equation (1) in which the tristimulus values Xs, Ys, and Zs of the light source are applied as Xn, Yn, and Zn values in JIS Z 8729:

$$a^* = 500(Fx - Fy)$$
$$b^* = 500(Fy - Fz) \quad (1)$$

where
$Fx = (Xx/Xs)^{1/3}$
$Fy = (Yx/Ys)^{1/3}$
$Fz = (Zx/Zs)^{1/3}$

Figure 13:
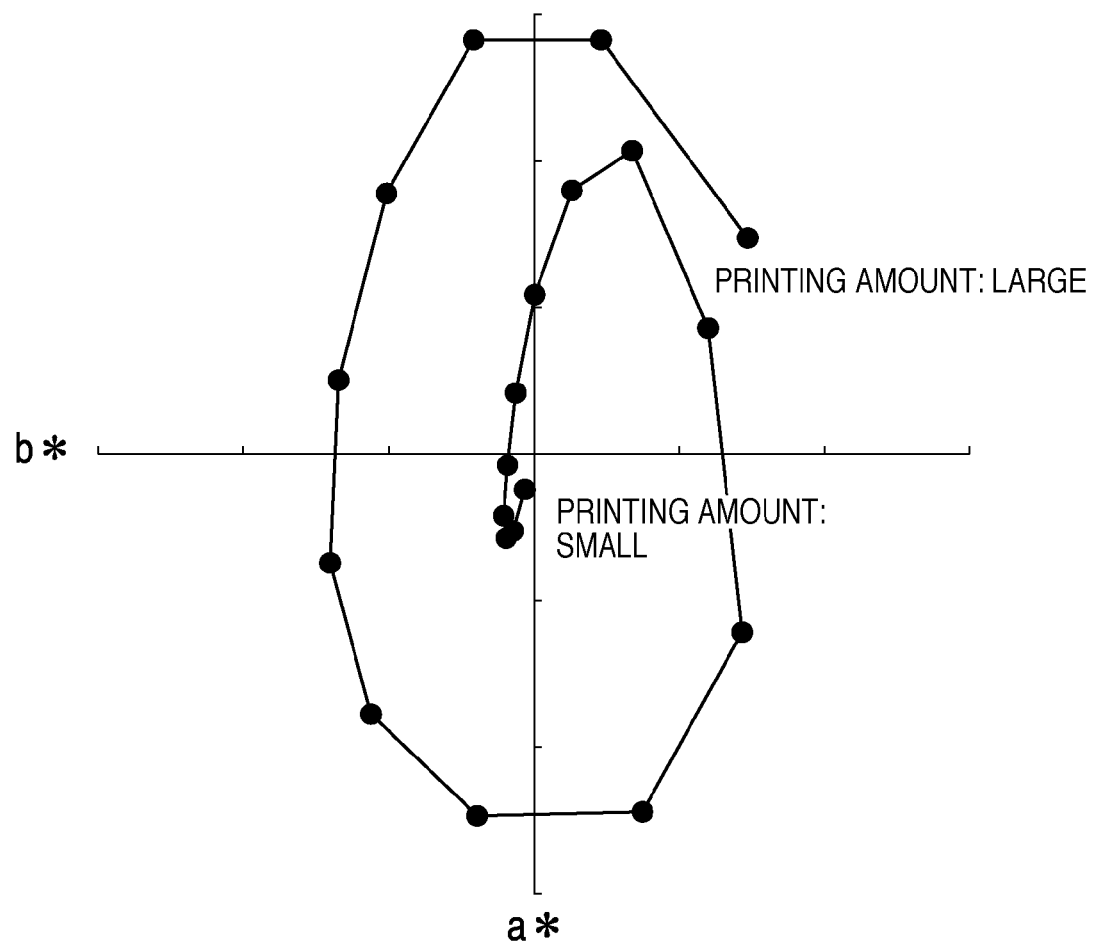
FIG. 13 is a graph for explaining an example of the result of measuring a specular color.

The result of measuring the specular color will be explained with reference to FIG. 13. FIG. 13 shows the result of measuring the specular color of a sample printed by changing the amount of CL ink while fixing the amount of color ink to 0. A larger distance between a point plotted on the graph and the origin indicates a greater stain of specular reflection.

[User Interface]

A UI provided by the printing condition setting unit 102 will be explained with reference to FIG. 15.

When the user inputs a printing instruction, the printing condition setting unit 102 displays a printing condition setting window 1501 on the display unit 1404. The user uses an "input image data" setting box 1502 to designate the file name or path name of an image to be input from the image input unit 101, and uses a "recording paper type" combo box 1503 to select the type of recording medium. Also, the user operates a color processing method setting section 1504 to set an evaluation item on which the user puts importance. More specifically, the user operates a slider 1505 to set the priority of "suppression of the heterogeneity of specular glossiness", operates a slider 1506 to set the priority of "suppression of the heterogeneity of image clarity", and operates a slider 1507 to set the priority of "suppression of the heterogeneity of specular color". The user operates a slider 1508 to set the amount (consumption) of CL ink used.

The initial state of the printing condition setting window 1501, that is, the default state immediately after displaying it is preferably a state in which the priorities of the three items are best balanced (for example, equal priorities). When the user changes the priority of one of the items by synchronizing the sliders 1505 to 1507, the priorities of the remaining items are preferably maximized within their settable ranges. It is also preferable to automatically update the settings of the sliders 1505 to 1507 in synchronization with the operation of the slider 1508.

When the user presses a print button 1509, the printing condition setting unit 102 outputs printing conditions 202 corresponding to conditions set by the user, and the image input unit 101, image processing unit 103, and image output unit 104 execute printing. When the user presses a cancel button 1510, printing stops.

[Generation of Color Separation Table]

Details of a color separation table generation method will be described with reference to FIGS. 16 to 24.

Figure 16:
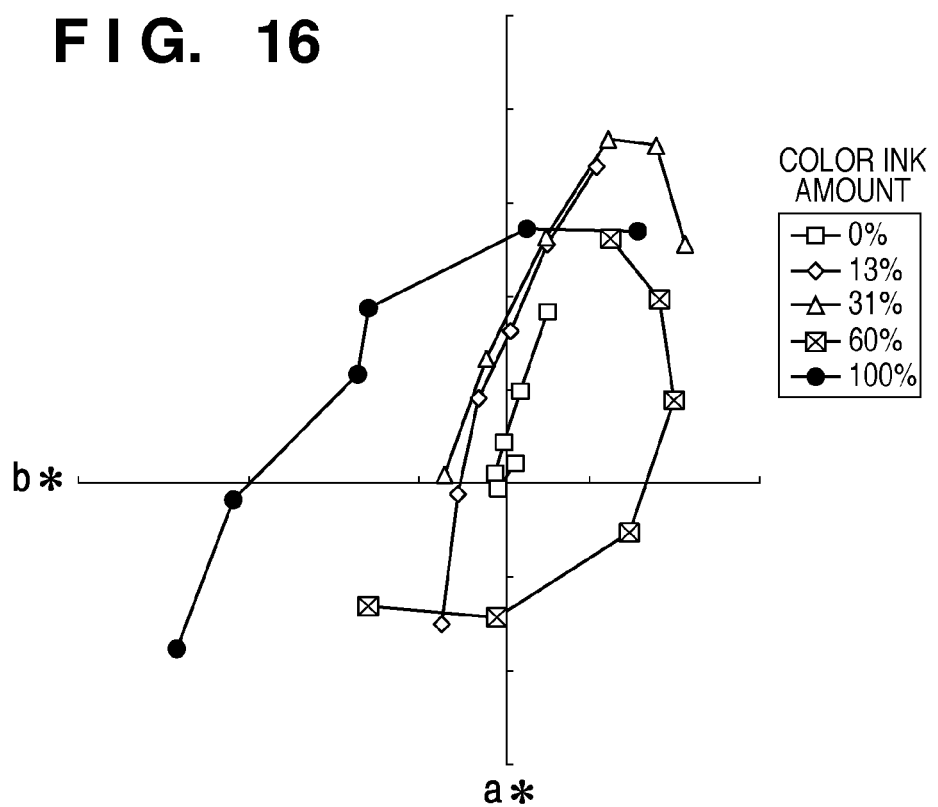
FIG. 16 is a graph showing the result of measuring the specular colors of patches different in the amount of clear ink using the amount of color ink as a parameter.
Figure 17:
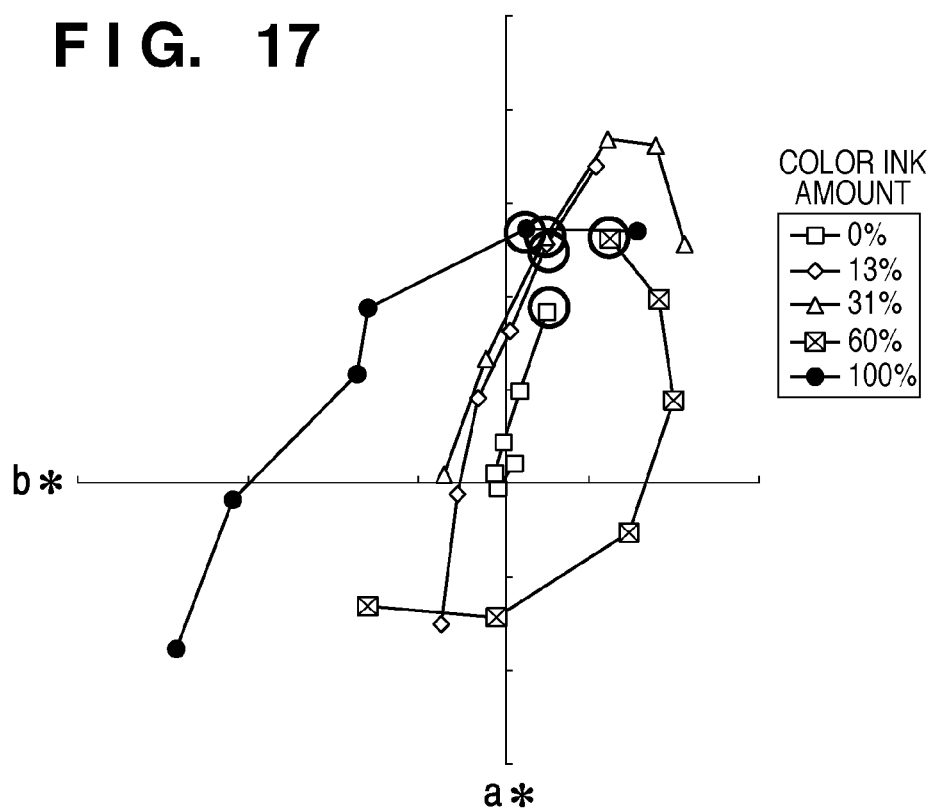
FIG. 17 is a graph showing measurement values selected to reduce the heterogeneity of specular color between measurement values different in the amount of color ink.
Figure 18:
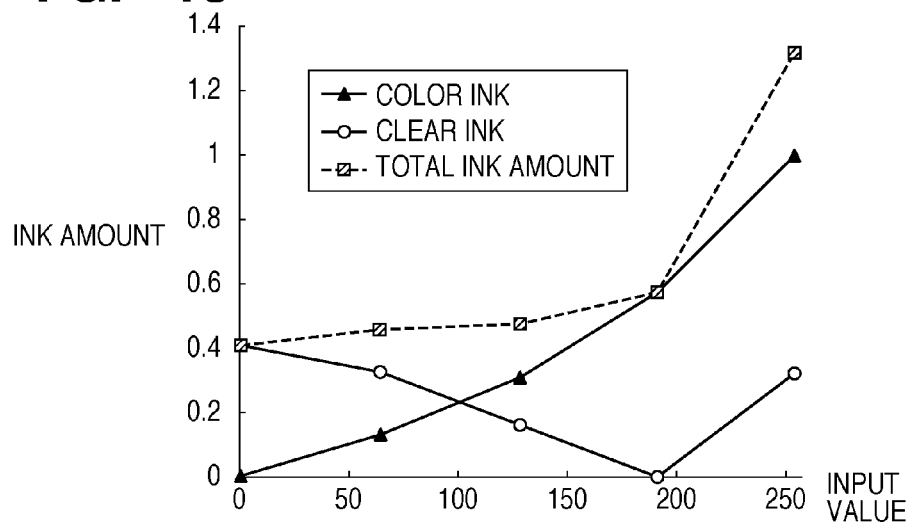
FIG. 18 is a graph showing the amount of color ink, the amount of clear ink, and the total ink amount for a selected patch with respect to the input value.

FIG. 16 shows the result of measuring the specular colors of patches different in the amount of CL ink using the amount of color ink as a parameter. When measurement values are selected to reduce the heterogeneity of specular color between measurement values different in the amount of color ink, circled measurement values in FIG. 17 are selected. For example, measurement values are selected so that the difference in measurement value between adjacent colors or gray levels does not exceed a predetermined threshold. FIG. 18 shows the amount of color ink, the amount of CL ink, and the total ink amount for a selected patch with respect to the input value. Although the total ink amount changes depending on the characteristics of ink used, the total ink amount at each input value preferably becomes almost an ink amount (almost constant multiple of ink amount) obtained by multiplying, by a constant, an ink amount corresponding to a minimum total ink amount.

Figure 19A:
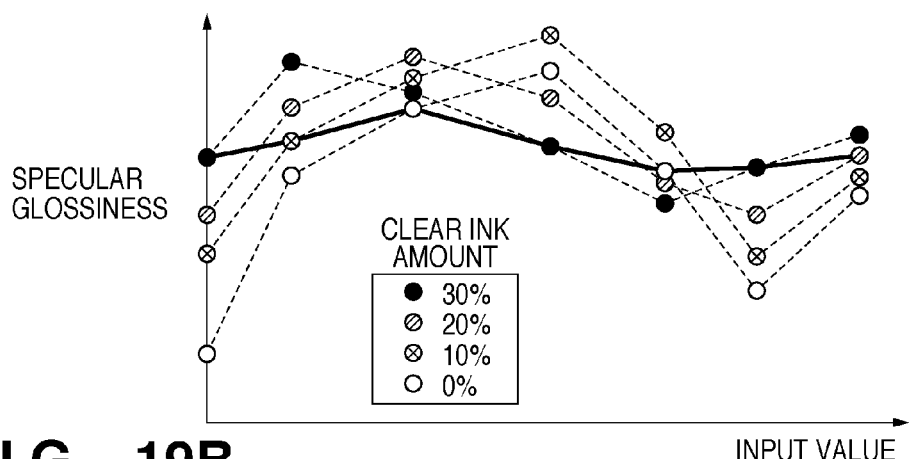
FIGS. 19A and 19B are graphs showing the results of measuring the specular glossinesses and image clarities of a plurality of patches when the amount of clear ink is changed with respect to the input value.

FIG. 19A shows the result of measuring the specular glossinesses of a plurality of patches when the amount of CL ink is changed with respect to the input value. Measurement values connected by a solid line are those selected to reduce the heterogeneity of specular glossiness. For example, measurement values are selected so that the difference in measurement value between adjacent colors or gray levels does not exceed a predetermined threshold.

Figure 19B:
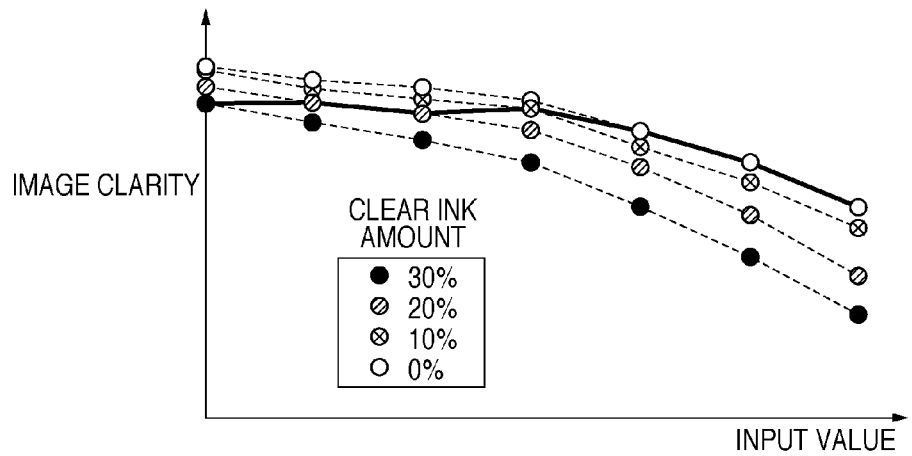

FIG. 19B shows the result of measuring the image clarities of a plurality of patches when the amount of CL ink is changed with respect to the input value. Measurement values connected by a solid line are those selected to reduce the heterogeneity of image clarity. For example, measurement values are selected so that the difference in measurement value between adjacent colors or gray levels does not exceed a predetermined threshold.

A color separation table 205 which preferentially suppresses the heterogeneity of specular color is obtained from patches (measurement values) selected by the selection method of FIG. 17. Similarly, a color separation table 205 which preferentially suppresses the heterogeneity of specular glossiness is obtained from patches (measurement values) selected by the selection method of FIG. 19A. A color separation table 205 which preferentially suppresses the heterogeneity of image clarity is obtained from patches (measurement values) selected by the selection method of FIG. 19B.

As shown in FIG. 15, in the embodiment, priority can be set for each of suppression of the heterogeneity of specular glossiness, that of the heterogeneity of image clarity, and that of the heterogeneity of specular color. That is, selectable measurement values (patches) are limited in accordance with the set priority.

Figure 21:
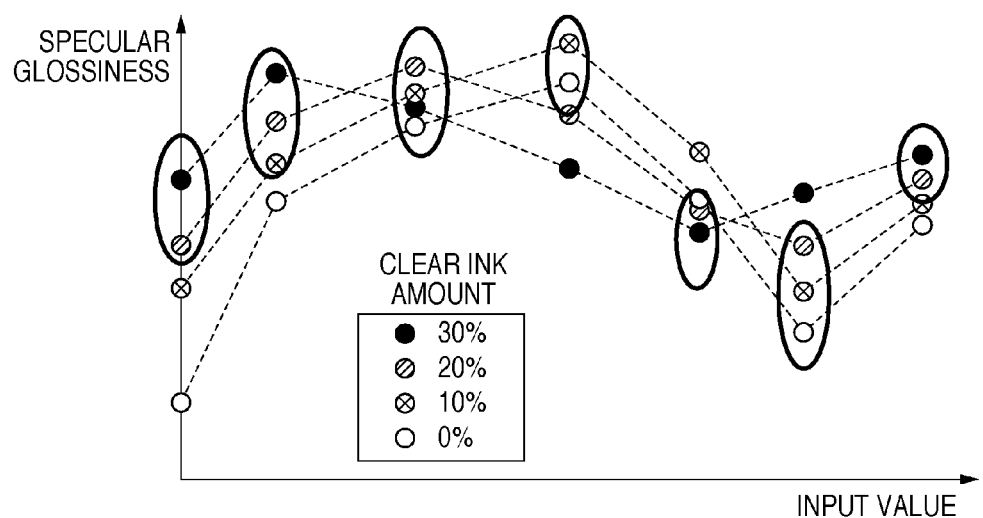
FIG. 21 is a graph showing measurement values (patches) selectable in accordance with the setting of priority of suppressing the heterogeneity of specular glossiness.
Figure 22:
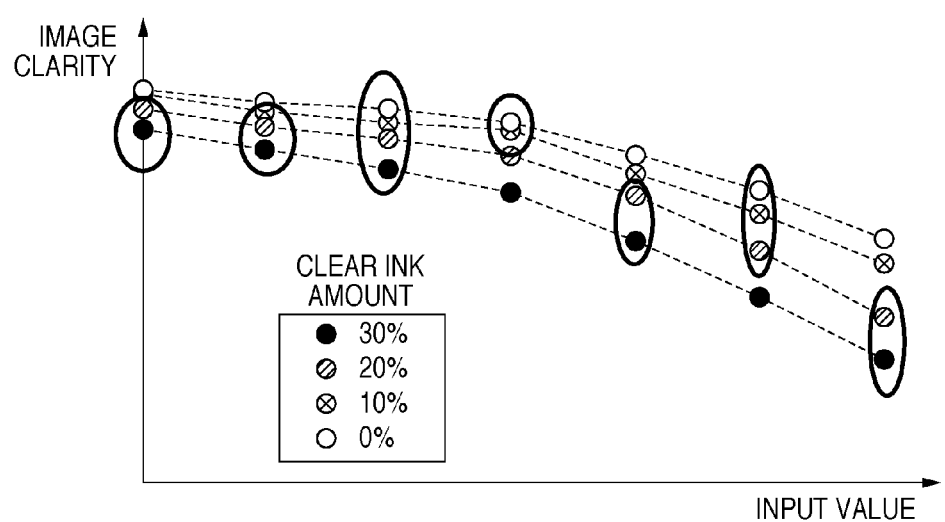
FIG. 22 is a graph showing measurement values (patches) selectable in accordance with the setting of priority of suppressing the heterogeneity of image clarity.

FIG. 20 shows measurement values (patches) selectable in accordance with the setting of priority of suppressing the heterogeneity of specular color. Similarly, FIG. 21 shows measurement values (patches) selectable in accordance with the setting of priority of suppressing the heterogeneity of specular glossiness. FIG. 22 shows measurement values (patches) selectable in accordance with the setting of priority of suppressing the heterogeneity of image clarity. All these drawings show that measurement values in a range surrounded by a circle or ellipse are selectable. Measurement values are selected from the selection range to reduce each heterogeneity, generating the color separation table 205.

Color separation tables 205 corresponding to respective priorities for the heterogeneities of specular glossiness, image clarity, and specular color are generated from patches (measurement values) selected by the selection methods of FIGS. 20 to 22.

Figure 23:
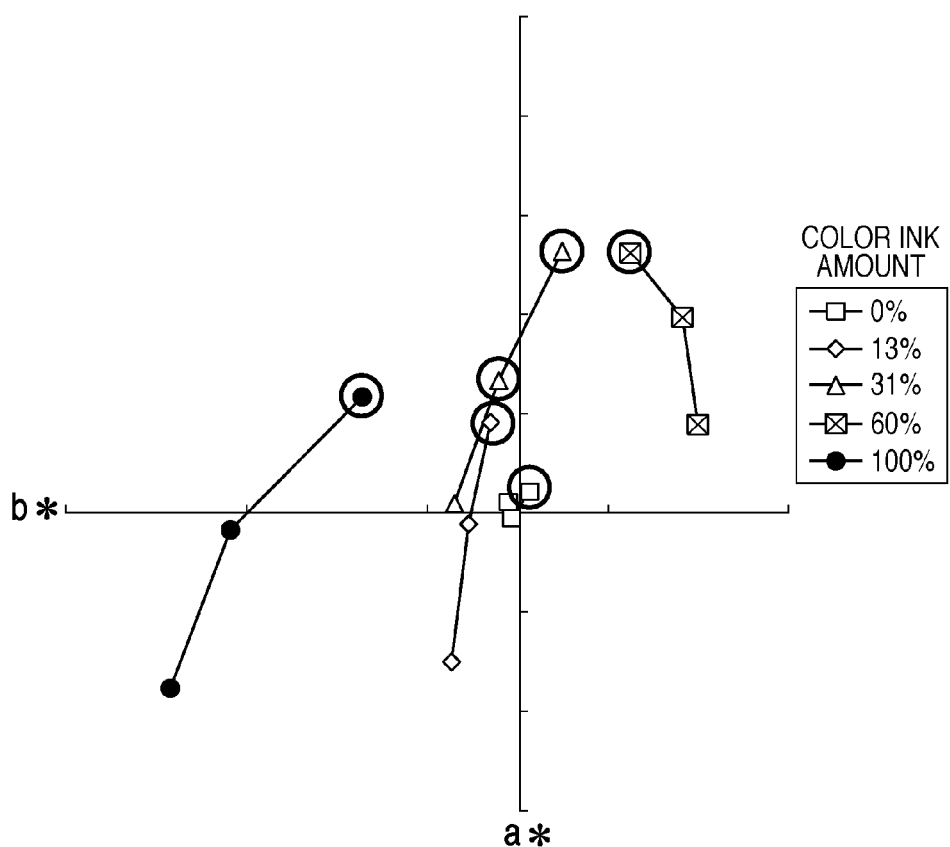
FIG. 23 is a graph showing the result of measuring, using the amount of color ink as a parameter, the specular colors of patches different in the amount of clear ink that satisfy the setting of the amount of clear ink used.

As shown in FIG. 15, the embodiment can set the amount of CL ink used. FIG. 23 shows the result of measuring the specular colors of patches different in the amount of CL ink using the amount of color ink as a parameter, similar to FIG. 16. FIG. 23 shows only measurement values which satisfy the setting of the amount of CL ink used. That is, only some of measurement values shown in FIG. 16 are shown, and circled measurement values are those selected to reduce the heterogeneity of specular color, similar to FIG. 17.

FIG. 24A shows the result of measuring the specular glossinesses of a plurality of patches when the amount of CL ink is changed with respect to the input value, similar to FIG. 19A. FIG. 24A shows only measurement values which satisfy the setting of the amount of CL ink used. That is, only some of measurement values shown in FIG. 19A are shown, and measurement values connected by a solid line are those selected to reduce the heterogeneity of specular glossiness, similar to FIG. 19A. FIG. 24B shows the result of measuring the image clarities of a plurality of patches when the amount of CL ink is changed with respect to the input value, similar to FIG. 19B. FIG. 24B shows only measurement values which satisfy the setting of the amount of CL ink used. That is, only some of measurement values shown in FIG. 19B are shown, and measurement values connected by a solid line are those selected to reduce the heterogeneity of image clarity, similar to FIG. 19B.

Color separation tables 205 corresponding to respective priorities for the heterogeneities of specular glossiness, image clarity, and specular color and also corresponding to the setting of the amount of CL ink used are generated from patches (measurement values) selected by the selection methods of FIGS. 23, 24A, and 24B.

Modification of Embodiment

For example, priorities may be set respectively for the heterogeneities of specular glossiness, image clarity, and specular color for each color reproductive region or lightness region. In general, heavy use of cyan ink readily causes the bronze phenomenon. Thus, when determining a color separation value in a color reproductive region near cyan, the color separation value is determined based on the measurement value of the specular color. Also in general, heavy use of yellow ink readily generates the thin-film interference. When, therefore, determining a color separation value in a color reproductive region near yellow, the color separation value is determined based on the measurement value of the specular color. Generally, the image clarity readily decreases in a region where the lightness is relatively low. When determining a color separation value in this region, the color separation value is determined based on the measurement value of the image clarity. Further, the specular glossiness readily varies in an intermediate lightness region. When determining a color separation value in the intermediate lightness region, the color separation value is determined based on the measurement value of the specular glossiness.

In this way, a color separation table 205 which suppresses the heterogeneity of glossiness or specular color can be generated between different colors or gray levels. The ink value of the CL ink is determined by printing patches while changing the amount of CL ink with respect to the amount of color ink that is determined based on the color separation table 401 generated in advance for color inks. Hence, the color separation table 205 can be generated using a relatively small number of patches. The user can set which of the heterogeneity of specular glossiness, that of image clarity, and that of specular color is preferentially suppressed. An item to which the user attaches importance can be preferentially improved. The color separation table 205 can also be generated in consideration of the consumption of the CL ink.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086465, filed Apr. 2, 2010, which is hereby incorporated by reference herein in its entirety.

What is claimed is:

1. An image forming apparatus for forming an image on a recording medium using a second color separation table which is generated by a color processing apparatus comprising:
   an obtainer, configured to obtain measurement values regarding a gloss characteristic of a plurality of clear patches formed with a plurality of different amounts of the clear ink overlapping a plurality of color patches formed with color separated values from a first color separation table for the color inks;
   a selector, configured to select one measurement value from the measurement values of the plurality of clear patches for each color or gray level indicated by patch data of the plurality of color patches based on the obtained gloss characteristic; and
   a generator, configured to generate, based on the selected measurement value and the first color separation table for the color inks, the second color separation table to be used in a case where the color inks and the clear ink are used,
   wherein the gloss characteristic includes specular glossiness, image clarity, and specular color, and
   wherein the generator generates the second color separation table based on priority for each of the specular glossiness, image clarity, and specular color for each color reproductive region and each lightness region.

2. The method according to claim 1, further comprising the step of generating the patch data by adjusting the plurality of different amounts of the clear material not to exceed a limitation of a total amount of applied color materials for a recording medium on which the patches are formed.

3. The method according to claim 1, wherein in the selecting step, the measurement value is selected to prevent a difference in measurement value between adjacent colors or gray levels from exceeding a predetermined threshold.

4. The method according to claim 1, wherein in the generating step, the second color separation table is generated based on a setting of consumption of the clear material.

5. The method according to claim 1, wherein in the generating step, the second color separation table in which a total color material amount for each input value is a substantially constant multiple of a minimum total color material is generated.

6. A color processing apparatus comprising:
   an obtainer, configured to obtain measurement values regarding a gloss characteristic of a plurality of clear patches formed with a plurality of different amounts of a clear material overlapping a plurality of color patches formed with an output value from a first color separation table for color materials;
   a selector, configured to select one measurement value from the measurement values of the plurality of clear patches for each color or gray level indicated by patch data of the plurality of color patches based on the obtained gloss characteristic; and
   a generator, configured to generate, based on the selected measurement value and the first color separation table, a second color separation table to be used in a case where the color materials and the clear material are used,
   wherein the gloss characteristic includes specular glossiness, image clarity, and specular color, and wherein the generator generates the second color separation table based on priority for each of the specular glossiness, image clarity, and specular color for each color reproductive region and each lightness region.

7. A color processing apparatus for generating a color separation table used by an image forming apparatus which forms an image on a recording medium using color inks and a clear ink, comprising:
- an obtainer, configured to obtain measurement values regarding a gloss characteristic of a plurality of clear patches formed with a plurality of different amounts of the clear ink overlapping a plurality of color patches formed with color separated values from a first color separation table for the color inks;
- a selector, configured to select one measurement value from the measurement values of the plurality of clear patches for each color or gray level indicated by patch data of the plurality of color patches based on the obtained gloss characteristic; and
- a generator, configured to generate, based on the selected measurement value and the first color separation table for the color inks, a second color separation table to be used in a case where the color inks and the clear ink are used,
- wherein the gloss characteristic includes specular glossiness, image clarity, and specular color, and
- wherein the generator generates the second color separation table based on priority for each of the specular glossiness, image clarity, and specular color for each color reproductive region and each lightness region.

8. A method of printing an image on a recording medium using a second color separation table which is generated using a color processing method comprising:
using a processor to perform the steps of:
- obtaining measurement values regarding a gloss characteristic of a plurality of clear patches formed with a plurality of different amounts of a clear material overlapping a plurality of color patches formed with an output value from a first color separation table for color materials;
- selecting one measurement value from the measurement values of the plurality of clear patches for each color or gray level indicated by patch data of the plurality of color patches based on the obtained gloss characteristic; and
- generating, based on the selected measurement value and the first color separation table, the second color separation table to be used in a case where the color materials and the clear material are used,
- wherein the gloss characteristic includes specular glossiness, image clarity, and specular color, and
- wherein in the generating step, the second color separation table is generated based on priority for each of the specular glossiness, image clarity, and specular color for each color reproductive region and each lightness region.

9. A printer for printing an image on a recording medium using a second color separation table which is generated by a color processing apparatus comprising:
- an obtainer, configured to obtain measurement values regarding a gloss characteristic of a plurality of clear patches formed with a plurality of different amounts of a clear material overlapping a plurality of color patches formed with an output value from a first color separation table for color materials;
- a selector, configured to select one measurement value from the measurement values of the plurality of clear patches for each color or gray level indicated by patch data of the plurality of color patches based on the obtained gloss characteristic; and
- a generator, configured to generate, based on the selected measurement value and the first color separation table, the second color separation table to be used in a case where the color materials and the clear material are used,
- wherein the gloss characteristic includes specular glossiness, image clarity, and specular color, and
- wherein the generator generates the second color separation table based on priority for each of the specular glossiness, image clarity, and specular color for each color reproductive region and each lightness region.

10. An image forming apparatus for forming an image on a recording medium using a second color separation table which is generated by a color processing apparatus comprising:
- an obtainer, configured to obtain measurement values regarding a gloss characteristic of a plurality of clear patches formed with a plurality of different amounts of the clear ink overlapping a plurality of color patches formed with color separated values from a first color separation table for the color inks;
- a selector, configured to select one measurement value from the measurement values of the plurality of clear patches for each color or gray level indicated by patch data of the plurality of color patches based on the obtained gloss characteristic; and
- a generator, configured to generate, based on the selected measurement value and the first color separation table for the color inks, the second color separation table to be used in a case where the color inks and the clear ink are used,
- wherein the gloss characteristic includes specular glossiness, image clarity, and specular color, and
- wherein the generator generates the second color separation table based on priority for each of the specular glossiness, image clarity, and specular color for each color reproductive region and each lightness region.

* * * * *